Feb. 3, 1942.    G. L. HART    2,271,821
TOOL SUPPORTING FRAME
Filed May 1, 1940    3 Sheets-Sheet 2
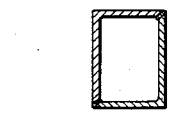
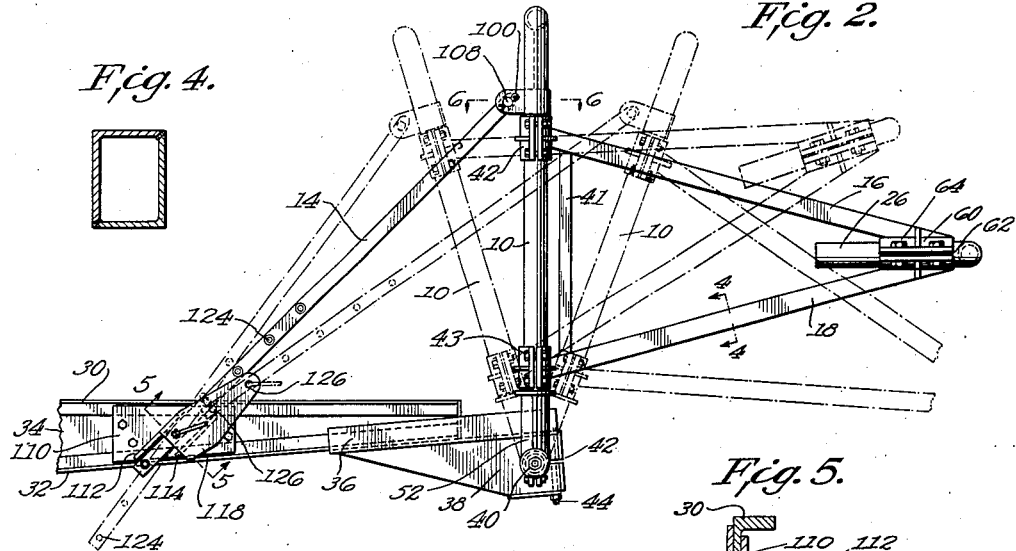
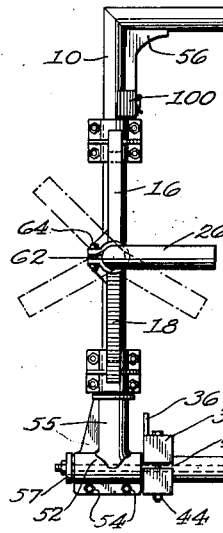
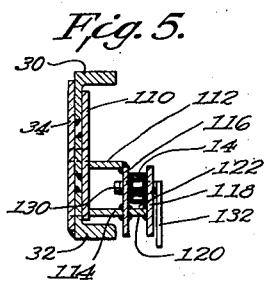
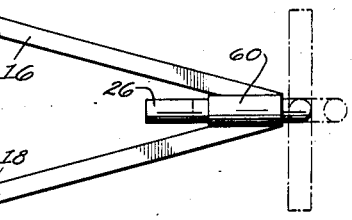
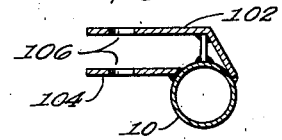
Inventor
George L. Hart.
By Cushman, Darby & Cushman
Attorneys Feb. 3, 1942. G. L. HART 2,271,821
TOOL SUPPORTING FRAME
Filed May 1, 1940 3 Sheets-Sheet 3
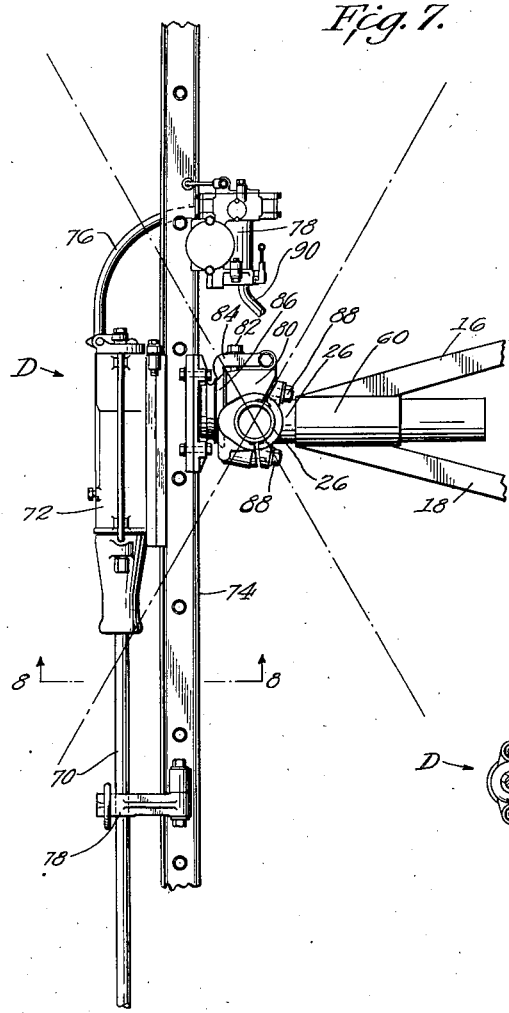
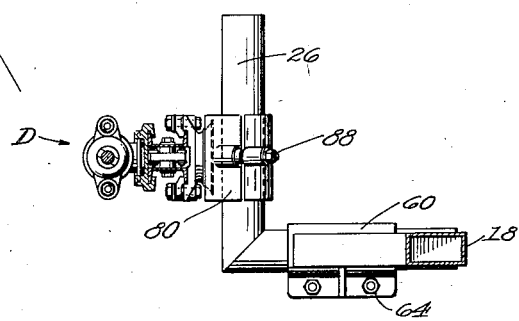
Inventor
George L. Hart.
By Cushman, Darby Cushman
Attorneys Patented Feb. 3, 1942

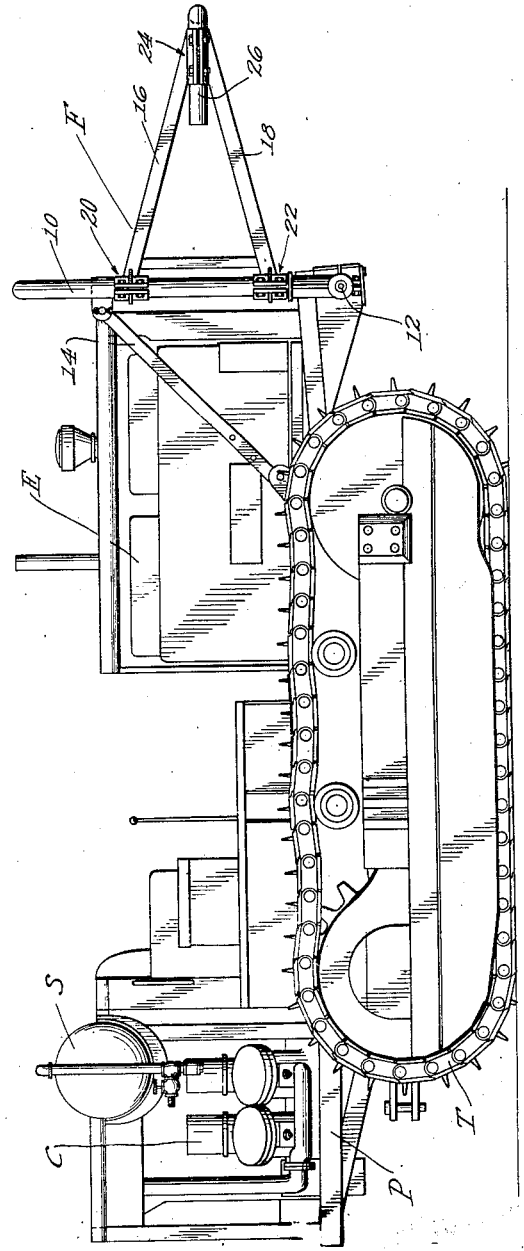

2,271,821

UNITED STATES PATENT OFFICE 2,271,821

TOOL SUPPORTING FRAME

George L. Hart, Mitchell, Ind.

Application May 1, 1940, Serial No. 332,855

9 Claims. (Cl. 255—51)

The present invention relates to a drilling frame for vehicles, such as tractors, whereby a tool such as a drill may be carried to a site and rigidly supported to perform such operations as drilling.

The principal object of the invention is to provide a frame which may be conveniently attached to such vehicles as tractors now in use, without modification of the structures of said vehicles.

Another principal object of the invention is to provide a frame having means to rigidly support a drill or similar tool in such manner that the tool may be adjusted in various planes to perform horizontal, vertical or angular drilling at various levels and positions.

The invention is principally useful in supporting such tools as drills operated by compressed air, and is preferably employed in association with a vehicle such as a tractor having an air compressor mounted thereon, so that the entire assembly of equipment including the compressor may be moved to the site where work is to be performed, and the drilling or other operation requiring compressed air carried out without the loss of air pressure due to friction in the air hose or line, which disadvantage results from the employment of drills supported at a site remote from the compressor.

Another important object of the invention is to provide a drill frame comprising a supporting standard or standards carried by the vehicle, which support the drill, which standards may be adjusted to substantially vertical position, and secured in such position, even though the vehicle is on a slope at the site where the work is to be performed. The drill frame is designed to adjustably support such well-known tools as tower or wagon drills.

The invention is of great usefulness in connection with road building, where it is often required that a series of vertical holes be drilled into rock or the like, or where a series of horizontal or angular holes are required to be drilled into vertical or sloping embankments to receive explosives for blasting.

Ancillary to the above objectives, it is a purpose of the invention to provide a frame for supporting drills or similar tools which may be collapsed to position occupying minimum space on the vehicles, so that the latter may be advanced into confined spaces where the work is to be performed.

Another object of the invention is to provide a frame for drills or the like carrying drill supporting arms which may be adjusted throughout a wide area from a single position of the vehicle, so that a number of horizontal, vertical or diagonal holes may be drilled without moving the vehicle.

A further object of the invention is to provide a frame as referred to in the preceding paragraph, wherein the arms are provided with adjustable drill supporting bars, which in turn adjustably support the drills, whereby increased flexibility of the use of the drills is provided.

In the drawings, which are illustrative of a preferred construction of the frame, which drawings are not intended to restrict the invention to any particular design:

Figure 1 is a side elevational view of a vehicle such as a tractor having an air compressor mounted on the rear end thereof, and a drill supporting frame of this application mounted on the front end thereof.

Figure 2 is a partial side elevational view of the front end of the chassis of a tractor, showing the manner in which the standards of the drill supporting frame may be adjusted to maintain said standards in vertical position if the vehicle is on a slope.

Figure 3 is a front elevational view of the drill carrying frame, showing various permissible adjustments of the parts thereof for different types of drilling.

Figures 4, 5 and 6 are enlarged partial sectional views taken respectively along the lines 4—4, 5—5 and 6—6 of Figure 2.

Figure 7 is an enlarged elevational view of the outer end of one of the drill supporting arms, showing the manner in which the drill is adjustably carried thereby, and, Figure 8 is a horizontal sectional view taken along the line 8—8 of Figure 7 looking upwardly.

The tractor shown in Figure 1 is of conventional construction having an engine E at its front end, which engine drives the belt treads T to move the vehicle.

Attached to the rear end of the tractor is a horizontal supporting platform P on which is disposed a compressor C which may be of conventional construction. The compressor includes a receiving tank S for the compressed air, which is conveyed to the tools or drills carried on the front end of the tractor, hereinafter described, by short pipes or hose. The compressor is driven by a shaft having power connection with the drive shaft of the tractor, in a manner which need not be described in this application. The precise construction and arrangement of the compressor on the rear end of the tractor is an invention which is the subject matter of another application and need not be described in detail herein.

On the front end of the tractor and forwardly of the engine E, the tool supporting frame F is mounted. This frame may be conveniently attached to the chassis of any conventional tractor as hereinafter described without modification of the tractor.

The frame comprises one or more standards 10 pivotally secured to the vehicle as at 12, and rigidly held in desired position with respect to the pivot 12 by a supporting brace 14 which is adapted to be fixed to the tractor chassis in various positions.

Extending beyond each standard 10 is a pair of supporting arms 16 and 18, rotatably secured to the standard 10 as at 20 and 22, respectively, so that the arms may be adjustably moved around the standard 10 in a horizontal plane.

The arms 16 and 18 converge in a vertical plane from their inner toward their outer ends, and where they join they form a split housing 24 to receive a drill supporting bar 26. The drill supporting bar may be adjustably rotated or moved longitudinally in its housing to dispose the drill or other tool in various positions, as hereinafter described. It will be understood that the drill or other tool of conventional construction, is carried by the drill supporting bar 26. The above described frame and the drill constitute a drilling assembly.

Referring to Figures 2 and 5, the conventional chassis or frame of a tractor is shown having upper and lower spaced angle members 30 and 32 with a plate 34 secured as by welding to the inner faces thereof. An angle plate 36 is secured as by bolting to the forward end of the chassis, projecting beyond the same as shown in Figure 2, and this angle carries a depending housing 38 having a horizontal lateral opening therethrough to receive a horizontal shaft 40 on which the standards 10 are pivotally mounted. The housing 38 is split as at 42, leading from the opening which receives the shaft 40, and suitable bolts 44 are provided to tighten the housing around the shaft 40 to rigidly retain said shaft in adjusted position.

As shown in Figure 3, a single shaft 40 extends laterally across the front of the tractor, and on each end of the shaft a vertical standard 10 is mounted, each of said standards carrying converging supporting arms 16 and 18 for the drill supporting bars, so that two drills may be operated simultaneously from opposite sides of the tractor, or to increase the area through which a single drill may be operated from a given position of the tractor.

The arms 16 and 18 may be strengthened by a connecting brace 41, and at their rearward ends each arm carries a split housing 42 secured as by bolts 43 around the standard 10, so that the arms may be adjusted in a horizontal plane by rotation around the standard. This arrangement provides a wide area of operations for a given position of the vehicle, from across the front thereof back along each side of the vehicle, if two standards 10 are used as shown in Figure 3.

It will be understood, however, that the apparatus may be designed to use only a single standard 10, with its drill supporting arms, and this standard may be located centrally of the shaft 40 or at either end thereof. However, the arrangement where two standards are provided is preferred, and when two are used, a more rigid structure results by connecting them with an upper horizontal member 50, as shown in Figure 3.

The lower end of each standard comprises a split housing 52 having a transverse opening therethrough to encompass the shaft 40, the shaft 40 being inserted into said openings, after which suitable bolts 54 passing through opposed flanges may be tightened to rigidly secure the housings 52 around the shaft 40.

The housings 52 may have outside strengthening webs 55 as desired, and inside strengthening corner webs 56 may be provided between the standards 10 and the upper cross member 50 as shown in Figure 3. The ends of the hollow shaft 40 may be closed by metal discs 57 connected by a rod 58.

With the construction described above, the standards 10 may be adjusted between the full and dotted line positions shown in Figure 2, by loosening the bolts 44 and rotating the shaft 40 together with the standards 10 in the housings 38, after which the bolts 44 are tightened to secure the standards 10 in adjusted position, or by loosening the bolts 54 and rotating the housings 52 around the shaft 40, to the desired position, and then tightening the bolts 54. It has been found to be more convenient to perform this adjustment of the standards 10 to maintain them in vertical position, by simply loosening the bolts 54, although either method described above may be utilized. The above described adjustment of the standards is desirable in order to keep said standards in a substantially vertical plane when the tractor is positioned on a slope, during the performance of drilling or other operations.

The supporting arms 16 and 18 converge forwardly in a vertical plane as shown in Figures 2 and 3, and where they join there is provided a housing 60 integral with the arms, which housing is split on one side as at 62, and has a longitudinal opening therethrough to receive a drill supporting bar 26. The housing 60 is provided with flanges on opposite sides of the split leading from the longitudinal opening therethrough, and bolts 64 through said flanges serve to tighten the housing around the bar. While a straight drill supporting bar may be used, I prefer to employ a bar having a right angle bend therein, so that one leg of the bar may be secured in the housing 60 while the other end thereof extends to the side of the said housing and receives the drill, as hereinafter described.

The drill D is shown adjustably mounted on the bar 26 in Figures 7 and 8. This drill may be of any well-known type, and need not be described in detail herein. The drill comprises a reciprocating rod 70 having a piston (not shown) operated by air pressure within a cylinder 72, the cylinder being mounted for vertical adjustment in any well-known manner, on a vertical beam 74. Air is supplied to the cylinder 72 through a line 76 from a control fitting 78 secured to the beam 74. The drilling rod 70 may be provided with a guide 79 also secured to the beam 74.

The beam 74 carrying the drill is pivotally secured to a housing 80 in any suitable manner, and can be adjusted with respect to the arm 26 from position for vertical drilling as shown in Figure 7, to position for horizontal drilling, or for diagonal drilling either above or below the horizontal. The beam 74 carries a beveled plate 86 adjacent where it is pivoted to the housing 80, and the beam is held in any adjusted position by a pivoted locking member 84 held against the beveled surface of the plate 86 by any suitable means, such as the bolt 82. By loosening bolt 82, the beam 74 and its drill may be adjusted throughout any angle in a vertical plane with respect to the axis of that portion of the bar 26 which passes through the housing 60.

The housing 80 has an opening therethrough and is in two parts secured together by the bolts 88. By loosening the bolts 88, the beam 74 and the drill can be adjusted through any angle around that portion of the bar 26 which is at right angles to the axis through the opening in the housing 60, for vertical, horizontal or diagonal drilling above and below the horizontal plane through said axis.

A flexible air hose 90 extends from the control fitting 78 to the compressor reservoir S on the rear end of the tractor shown in Figure 1.

It will be seen that by reason of the construction of the drill assembly, and the manner in which it is mounted on the bar 26, the drill may be adjusted to any desired position in any desired vertical or diagonal plane, or throughout horizontal planes above and below the axis through the opening in the housing 60. Because of the construction of the drilling frame previously described, the apparatus has increased flexibility over prior art apparatus and any desired adjustment for the drill can be obtained by the manner in which the frame is positioned.

As shown in Figure 3, the bar 26 may be adjusted longitudinally in its housing 60 to advance the position of the drill forwardly from the full line to the dotted line position of the bar, for instance, for vertical drilling. The bar 26 can be turned in the housing 60 so that its outer end extends above or below the axis of the opening through the housing, for instance, for horizontal drilling, as shown by the dotted lines in Figure 3.

It will further be evident that the driller may carry a number of angular bars 26 having legs of various lengths, for use as convenient in drilling at any particular site. For example, referring to Figure 3, the vertical leg of the bar 26, (shown in dotted lines), might be of increased length, if desired, in order to position the drill relatively high or low with respect to the housing 60. If one of the legs of the bar 26 is relatively long, it might be used as described above, or that longer leg might be inserted into the opening in the housing 60 in order to position the drill at a greater distance horizontally beyond the forward end of the housing 60, than as shown in Figure 3.

The dotted line positions in Figure 3 of the drill receiving leg of the bar 26, on the left standard 10, show how the bar may be adjusted to various positions for convenient performance of angular or diagonal drilling.

One of the principal advantages of the apparatus of the present invention is that the tractor carrying the compressor may be driven to the immediate site where the drilling is to be performed, thus eliminating line losses of air pressure due to friction. Often-times, however, the drilling is performed at locations where the ground is rough, or where there is a considerable slope. In order to most rigidly and effectively carry the drilling apparatus, it is desirable to have the standards 10 of the frame in a substantially vertical plane no matter what the slope of the ground on which the tractor is positioned. As previously described, the standards 10 may be adjusted about the shaft 40 to keep them in vertical position, and I have devised securing means to hold the standards in the desired position.

Secured to each standard 10 immediately above the upper housings 42 on the arm 16 is a bracket 100. Referring to Figure 6, this bracket comprises a pair of spaced plates 102 and 104 welded in a suitable manner to the standard 10, said plates having aligned openings 106. The upper end of the frame brace member 14 is positioned between the plates 102 and 104 and is pivotally secured thereto by a pivot pin 108 shown in Figure 2. The lower end of the brace 14 is adjustably secured in a retaining assembly as described below.

Referring to Figures 2 and 5, the chassis of the tractor has bolted thereto, between the angle members 30 and 32, a plate 110. Welded to plate 110 are a pair of spaced plates 112 and 114, said plates being arranged at right angles to the plate 110. Welded to the outer edges of the plates 112 and 114 are a pair of spaced guide plates 116 and 118, the latter plates being of identical shape. Plate 118 is carried by plate 116 and spaced therefrom, through a connecting web 120 shown in Figure 5, leaving a channel 122 to receive the lower end of the brace 14. The brace 14 has a plurality of spaced latching apertures 124 therethrough and the plates 116 and 118 have a plurality of spaced aligned cooperating openings 126. When the tractor is on a horizontal surface, and the standards 10 are positioned vertically as shown in the full lines in Figure 2, a straight line through the openings 126 meets a straight line through the openings 124 at an acute angle. Any type of latching pin 130 having a handle 132 is provided to extend through the openings 126 and through a selected opening 124 in the brace 14 to lock the brace to the chassis of the tractor.

By reason of the arrangement of the series of openings in the plates 116 and 118, and in the brace 124, the standards 10 can be rotatably adjusted around the shaft 40, for instance, between the full and dotted line positions of Figure 2, and the drill frame is thus rigidly supported in any desired angular position. By means of the brace with its selective locking means, the drill frame is rigidly retained in the desired position.

It will be understood that the structures of the various parts described herein may be altered as desired. The construction of the various elements illustrated provides economy in fabrication and assembly. As shown in Figure 4, the arms 16 and 18 are preferably square or rectangular in cross section, being formed of two angle members welded together along their abutting edges. As shown in Figure 6, it is preferred to have the standards 10 formed from ordinary metal tubing of sufficient strength. It is likewise preferable to form the drill supporting arms of tubular metal bent intermediate its ends through a right angle, or the angle may be more or less than a right angle.

It will be seen that I have devised a drilling or similar assembly which may be conveniently mounted on a conventional vehicle, which provides a rigid support for the drill or similar tool, while at the same time permitting great flexibility of adjustment of the tool for different types of work.

I claim:

1. Drilling apparatus of the class described comprising a tractor having an engine and a drive shaft operated therefrom, a platform on the rear of said tractor having an air compressor supported thereon and operated from the tractor drive shaft, a drilling assembly comprising a drilling frame in front of and attached to said tractor and an air drill carried thereby, means on said tractor and said frame to adjust the latter about a transverse horizontal axis and support it in a substantially vertical plane when the tractor is on a slope, means to adjust the drill relatively to the frame about an axis parallel to the aforesaid axis, and an air line connecting said compressor and said drill for operating the latter.

2. A drilling frame for vehicles comprising a standard substantially vertically mounted on the vehicle, a pair of vertically spaced arms having means at their inner ends for securing the same to said standard for horizontal adjustment thereon, said arms converging toward one another and joining to form a housing at their outer ends, and a drill carrying bar adjustably secured in said housing.

3. A drilling frame for vehicles comprising a standard substantially vertically mounted on the vehicle, a pair of vertically spaced arms having means at their inner ends for securing the same to said standard for horizontal adjustment thereon, said arms converging toward one another and joining to form a housing at their outer ends, a drill carrying bar adjustably secured in said housing, said standard having means for pivotally mounting the same on the vehicle to adjust it in a substantially vertical position when the vehicle is on a slope, and means attached to said standard for rigidly securing the same in the desired adjusted position on the vehicle.

4. A drilling frame for vehicles comprising a shaft mounted laterally across and outside of the front end of the chassis of the vehicle for adjustable turning movement, standards secured to said shaft at opposite ends thereof for adjustment by the turning of said shaft to substantially vertical positions, a drill supporting arm secured to each of said standards for swinging movements about the axis of the same, a supporting brace pivoted to each of said standards adjacent the upper ends thereof, and extending toward the rear of the vehicle on opposite sides thereof, and means carried by the chassis of the vehicle on opposite sides thereof and rearwardly of the front end of the vehicle, for selectively securing said standards in various positions relative to the chassis of the vehicle, depending on the slope of the ground where the vehicle is positioned.

5. A drilling frame for vehicles comprising a pair of spaced supports secured to and outside of the front end of the vehicle, a substantially horizontal shaft mounted in said supports and having ends extending beyond the sides of the vehicle, standards secured to the ends of said shaft for adjustable turning movement around the same, to substantially vertical positions, a drill supporting arm secured to each of said standards for swinging movements about the axis of the same, means for rigidly securing said standards to one another, a supporting brace pivoted to one of said standards adjacent the upper end thereof and extending toward the rear of the vehicle, and means on said vehicle rearwardly of the front end thereof for selectively holding said brace in a plurality of adjusted positions, whereby said standards may be maintained in substantially vertical positions when the vehicle is on a slope.

6. The combination with a vehicle, of a standard arranged beside and supported by the same, an arm mounted at one end on the standard for angular adjustment about the axis of the standard, an L-shaped member one of the legs of which is longer than the other, a device on the free end of said arm to receive and hold either leg of said device in horizontal position, a drill-carrying bar, and means on said bar to grip either leg of said L-shaped device to cause the bar to be supported from said arm.

7. The combination with a vehicle, of a pair of standards spaced apart and having a rigid connecting member between the upper ends thereof, the standards being positioned in front of the vehicle, a hinge connection between the lower ends of the standards and said vehicle whereby both standards may be adjusted relatively to the vehicle so as to remain vertical when the vehicle is on a slope, means on the vehicle to secure the standards in any angular position into which they are brought, a pair of arms each mounted at one end on one of the standards for angular adjustment about the axis of that standard, and a pair of drill-carrying bars each mounted on the free end of one of said arms so as to be adjustable independently of the other in various directions including adjustments about an axis parallel to the aforesaid hinge.

8. A drilling frame for vehicles comprising a support secured to the chassis of the vehicle and extending forwardly thereof, a standard substantially vertically mounted on the vehicle and pivoted to the front end of said support for swinging movements about an axis transverse to the vehicle, an arm having means at its inner end for securing the same to said standard for adjustment angularly thereof, a drill-carrying bar, means on the outer end of said arm for supporting said bar for movements relatively to the standard including angular movements about an axis parallel to the aforesaid axis, and means for rigidly securing said standard in the desired adjusted position on said support.

9. A drilling frame for vehicles comprising a pair of spaced supports secured to the front end of the chassis of the vehicle and extending forwardly thereof, a substantially horizontal shaft mounted for adjustable turning movement in the front ends of said supports, a pair of standards secured to said shaft for adjustment to substantially vertical position by the turning movement of said shaft, said standards being located at opposite sides of the vehicle, means rigidly connecting the upper ends of said standards, arms carried respectively by said standards having at their inner ends means for securing the same to said standards for swinging movements across the front of the vehicle as well as outwardly and rearwardly towards the sides of the vehicle, two drill-carrying bars, and means on the outer end of each of said arms for adjustably supporting one of said bars.

GEORGE L. HART.